United States Patent [19]

Rodino et al.

[11] Patent Number: 4,844,212
[45] Date of Patent: Jul. 4, 1989

[54] MECHANICALLY ACTUATED BRAKE WITH AUTOMATIC ADJUSTMENT

[75] Inventors: Louis S. Rodino, Elkhart, Ind.; Clyde E. Carr, Galien, Mich.

[73] Assignee: Allied-Signal Inc., Morristown, N.J.

[21] Appl. No.: 192,988

[22] Filed: May 12, 1988

[51] Int. Cl.$^4$ .............................. F16D 65/56
[52] U.S. Cl. .................... 188/79.56; 188/331
[58] Field of Search ......... 188/79.55, 79.63, 196 BA, 188/328, 329, 330, 331, 332

[56] References Cited

U.S. PATENT DOCUMENTS

| | | | |
|---|---|---|---|
| 3,103,992 | 9/1963 | Dombeck | 188/79.56 |
| 3,294,202 | 12/1966 | Helvern | 188/79.56 |
| 3,352,383 | 11/1967 | Thompson . | |
| 3,360,084 | 12/1967 | Ayers | 188/79.56 |
| 3,589,476 | 6/1971 | Evans | 188/79.56 |
| 3,874,481 | 4/1975 | Margetts . | |
| 3,905,456 | 9/1975 | Torii et al. . | |
| 4,018,312 | 4/1977 | Muramoto et al. | 188/333 |
| 4,139,083 | 2/1979 | Hoshino et al. . | |
| 4,502,574 | 3/1985 | Spaargaren . | |
| 4,558,766 | 12/1985 | Palmer et al. . | |
| 4,588,052 | 5/1986 | Courbot . | |

FOREIGN PATENT DOCUMENTS 1176428 8/1964 Fed. Rep. of Germany .
52-11372 1/1977 Japan .
7606149 12/1976 Netherlands .
1191115 5/1970 United Kingdom .

Primary Examiner—Duane A. Reger
Attorney, Agent, or Firm—Larry J. Palguta; Ken C. Decker

[57] ABSTRACT

The mechanically actuated brake (10) with automatic adjustment comprises an integral support plate (20) having first (22) and second (24) axially extending support bars which position associated pairs of brake shoe ends (13, 15, 17, 19). The brake shoe ends (13, 15, 17, 19) are biased together by respective spring mechanisms (16, 18), and the shoes (12, 14) are captured between the support bars (22, 24) and shoe web rests (21). A pawl (60) is attached to one (12) of the brake shoes (12, 14) and is biased by a resilient member (70). The pawl (60) includes a protrusion (66) which slidably engages an axially extending angled ramp surface (25) of the second support bar (24). An end (64) of the pawl (60) engages an adjuster mechanism (50) located between the second pair (17, 19) of brake shoe ends (13, 15, 17, 19). The first pair (13, 15) of brake shoe ends has a mechanical actuator slide (30) disposed therebetween, the mechanical actuator slide (30) providing pivotable support for an actuator lever (40) which engages one (12) of the brake shoes (12, 14).

6 Claims, 3 Drawing Sheets

MECHANICALLY ACTUATED BRAKE WITH AUTOMATIC ADJUSTMENT

The present invention relates generally to a mechanically actuated brake with automatic adjustment, in particular a mechanically actuated brake having a single piece, integral support plate.

Mechanically actuated drum brakes having automatic adjustment devices typically require a large number of parts in order to provide the. requisite functions. Such drum brakes require shoe hold down pins, springs and cups, an anchor plate with posts, automatic adjustment linkages, cables, and other devices. It is highly desirable to provide a mechanically actuated drum brake with automatic adjustment which has a minimum number of parts and, because it has been designed with a view toward assembly methods, comprises parts which may accomplish more than one function.

The present invention provides a mechanically actuated brake with automatic adjustment, comprising a support plate providing support for a pair of brake shoes disposed oppositely from one another, first and second pairs of brake shoe ends connected by spring means urging the respective pairs of ends toward one another, the ends of the brake shoes having disposed therebetween respective first and second support bars extending axially from the support plate, a mechanical actuator slide disposed between the first pair of brake shoe ends and adjacent the first support bar, an actuator lever rotatably connected with the mechanical actuator slide and engaging one of the brake shoe ends, an expandable adjuster member disposed between the second pair of brake shoe ends and adjacent the second support bar, a pawl pivotably attached to one of the brake shoes and extending to a position adjacent the second support bar and engaging the adjuster member, the pawl having a protrusion engaging an axially extending and angled ramp surface of the second support bar, and the pawl biased by a resilient member connected with the one brake shoe, so that upon movement of the one brake shoe in one circumferential direction during braking the protrusion moves along the angled ramp surface and operates the adjuster member.

The mechanically actuated brake of the present invention accomplishes the objectives of requiring fewer parts, reduces the number of right- and left-handed parts, eliminates threaded connectors, requires a minimal orientation of parts and fewer assemble and insertion directions. The support plate is designed to locate the shoe assemblies, to serve as a braking anchor, and to initiate travel of the adjustment lever. This eliminates several components, i.e., shoe hold-down pins, springs and cups, anchor plates or posts, and automatic adjustment linkage. Additionally, there is an almost total elimination of right- and left-handed Parts, which results in a reduction of tooling costs. The support plate is designed for progressive die fabrication as opposed to previously utilized methods of manufacture.

One way of carrying out the invention is described in detail below with reference to the drawings which illustrate an embodiment in which.

Figure 1:
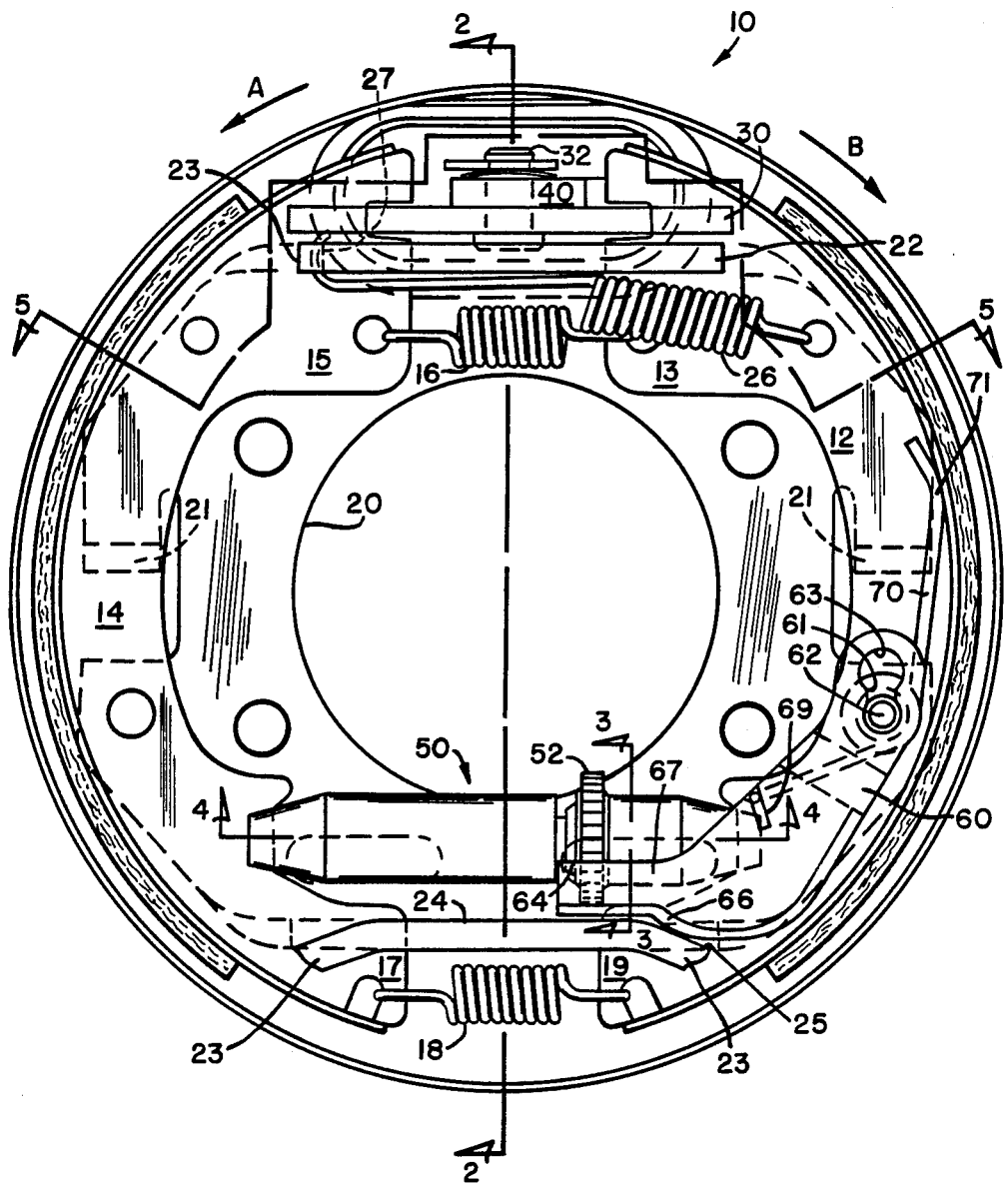
FIG. 1 is a plan view of the mechanically actuated brake of the present invention.
Figure 2:
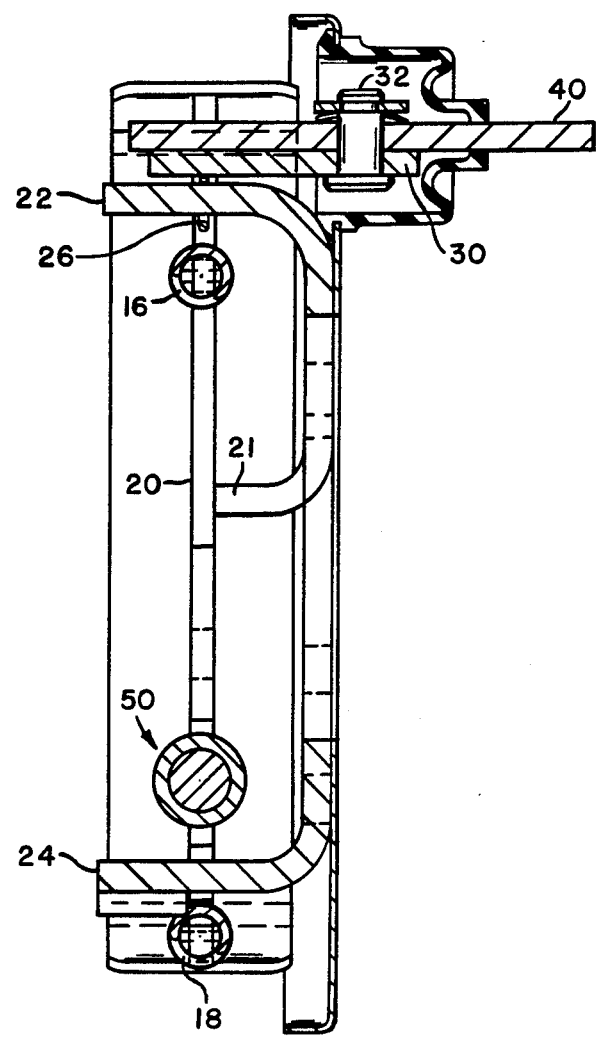
FIG. 2 is a section view taken along view line 2—2 of FIG. 1.
Figure 3:
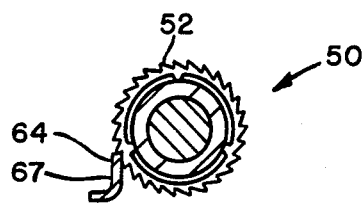
FIG. 3 is a section view taken along view line 3—3 of FIG. 1.
Figure 4:
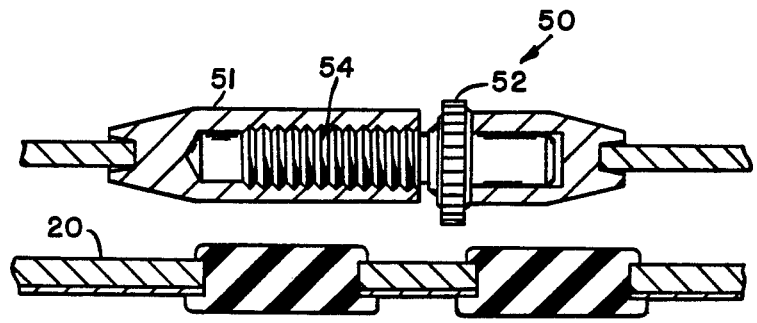
FIG. 4 is a section view taken along view line 4—4 of FIG. 1.
Figure 5:
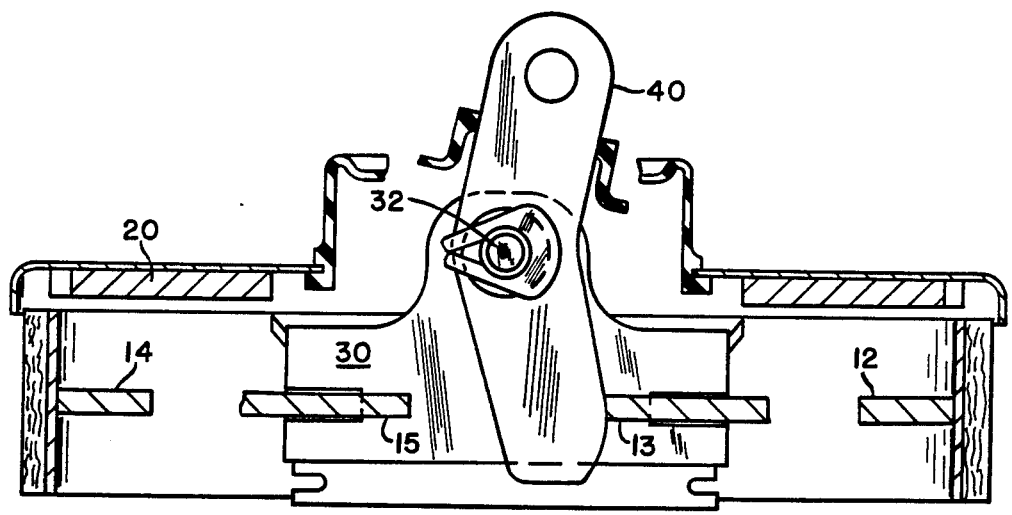
FIG. 5 is a section view taken along view line 5—5 of FIG. 1.

The mechanically actuated brake is designated generally by reference numeral 10 in FIG. 1. Brake 10 comprises a pair of brake shoes 12 and 14 having opposing pairs of brake shoe ends biased toward one another by spring means 16 and 18. The shoes are maintained in spaced relationship from one another by means of the support plate 20 which includes a first axially extending support bar 22 and a second axially extending support bar 24. Support bars 22 and 24 have a T-shaped lateral cross section. First support bar 22 receives opposing brake shoe ends 13 and 15 and second support bar 24 receives opposing brake shoe ends 17 and 19. Support bars 22 and 24 have laterally extending ends 23 that retain axially in place the respective brake shoe ends. End 13 of brake shoe 12 includes a spring 26 which exrends between shoe 12 and seat 27 of first support bar 22, wherein the spring 26 is attached to first support bar 22 adjacent shoe end 13. During normal braking when the vehicle is traveling in the forward direction whereby the brake drum (not shown) is rotating in the direction of arrow A, spring 26 assists in maintaining the position of trailing snoe 12. Support plate 20 also includes axially extending shoe web rests 21 which are formed from the support plate and engage slidably the webs of shoes 12 and 14. Disposed between shoe ends 13 and 15 is a mechanical actuator slide 30 supporting a pin 32 which provides rotatable support for an actuator lever 40. Actuator lever 40 engages shoe end 13 so that as lever 40 is pivoted about pin 32, shoe end 13 is biased radially away from shoe and 15. Located between shoe ends 17 and 19 is an automatic adjuster mechanism designated generally by reference numeral 50. Adjuster mechanism 50 is disposed substantially parallel to second support bar 24 and maintains the spaced relationship of shoe ends 17 and 19. A pawl 60 is attached rotatably to shoe 12 by means of pin 62 which is received within enlarged section 63 ot slot 61. Pawl 60 includes a curved pawl protrusion 66 and a pawl end 64 which engages the star wheel 52 of the adjuster mechanism 50. Pawl end 64 is at pawl arm 67 which is disposed substantially parallel to the second support bar 24. Second support bar 24 includes an axially extending and angled ramp surface 25 which is engaged by the curved pawl protrusion 66. A resilient member 70 is mounted about pin 62 with one end 71 engaging the rim of brake shoe 12 while the other end is received within slot 9 of pawl 60 so as to bias pawl 60 in a counter clockwise direction about pin 62.

When actuator lever 40 is operated by the vehicle operator, lever 40 pivots about pin 32 and causes brake shoe ends 13 and 15 to separate radially from one another. The radial expansion of shoes 12 and 14 toward engagement with the brake drum (not shown) causes shoes 12 and 14 to engage the drum which is rotating in direction A and effect braking of the vehicle. When the vehicle is backing up and the drum is rotating is the direction of arrow B, the rotation of lever 40 about pin 32 causes the shoes 12 and 14 to expand radially to contact the brake drum and effect braking during reverse movement of the vehicle. The slight movement of shoe 12 in a clockwise direction as the shoe engages the drum rotating in the direction of arrow B, causes curved pawl protrusion 66 to travel up angled ramp surface 25 of second support bar 24, which results in pawl end 64 moving radially inwardly and rotating star wheel 52. Resilient member 70 ensures that Pawl end 64 and arm 67 return to their predetermined positions illustrated in FIG. 1 at the termination of braking. The rotation of star wheel 52 causes adjustor member 50 to expand and move the brake shoes to an adjusted position so that they remain closely adjacent the brake drum despite the wear of friction material on the brake shoes. As the friction material of the brake shoes wear, rotation of star wheel 52 relative to nut 51 causes, by means of screw 54, adjustor member 50 to expand so that the brake shoes are expanded radially to an adjusted position.

The mechanically actuated brake with automatic adjustment requires a minimum number of parts, and the reduction in the number of parts and of left- and right-handed parts can result in a very economically produced and efficiently operated brake. Because the support plate locates the brake shoes, the support plate can serve as a braking anchor and also initiate the travel of the pawl during braking. This results in the elimination of several components such as shoe hold-down pins, springs, cups, anchor posts, and automatic adjustment linkage. There has been accomplished an almost total elimination of right- and left-handed piece parts, which results in a reduction of tooling costs. The support plate may be fabricated by means of progressive die fabrication, and the total cost of the brake significantly reduced.

Other provisions of the invention or variations will become apparent to those skilled in the art and will suggest themselves from the specific application of the application. It is intended that such variations and revisions of the invention as are to be expected on the part of those skilled in the art, to suit individual design preference and which incorporate the herein disclosed principles, will be included in the scope of the following claims as equivalents thereof.

We claim:

1. A mechanically actuated brake with automatic adjustment, comprising a support plate providing support for a pair of brake shoes disposed oppositely from one another, first and second pairs of brake shoe ends connected by spring means urging the respective pairs of ends toward one another, the ends of the brake shoes having disposed therebetween respective first and second support bars extending axially from the support plate, a spring disposed at the first pair of shoe ends and extending between a brake shoe end and the first support bar, a mechanical actuator slide disposed between the first pair of brake shoe ends and adjacent the first support bar, an actuator lever rotatably connected with the mechanical actuator slide and engaging one of the brake shoe ends, a single expandable adjuster member disposed between the second pair of brake shoe ends and adjacent the second support bar, a pawl pivotably attached to one of the brake shoes and extending to a position adjacent the second support bar and engaging the adjuster member, the pawl having a protrusion engaging an axially extending and angled ramp surface of the second support bar, and the pawl biased by a resilient member connected with the one brake shoe, so that upon movement of the one brake shoe in one circumferential direction during braking the protrusion, moves along the angled ramp surface and operates the adjuster member.

2. The mechanically actuated brake in accordance with claim 1, wherein the support plate comprises a pair of shoe web rests each of which extend axially to provide a surface engaged by a web of the associated brake shoe, so that the brake shoes are held in axial position between the shoe web rests and first and second support bars.

3. The mechanically actuated brake in accordance with claim 2, wherein the spring means between the first pair of shoe ends is disposed radially inwardly of the first support bar, the first support bar preventing said spring means from engaging the actuator slide and actuator lever.

4. The mechanically actuated brake in accordance with claim 2, wherein the spring means between the second pair of shoe ends is disposed radially outwardly of the second support bar, the second support bar preventing said spring means from engaging the pawl and adjuster member.

5. The mechanically actuated brake in accordance with claim 1, wherein the support plate, first and second support bars, and shoe web rests comprise a single integral member.

6. The mechanically actuated brake in accordance with claim 5, wherein the support bars are T-shaped and retain axially in place the respective shoe ends.

* * * * *